US008065680B2

(12) United States Patent
Parvathaneni et al.

(10) Patent No.: US 8,065,680 B2
(45) Date of Patent: Nov. 22, 2011

(54) DATA GATEWAY FOR JOBS MANAGEMENT BASED ON A PERSISTENT JOB TABLE AND A SERVER TABLE

(75) Inventors: Bhaskar A. Parvathaneni, Cupertino, CA (US); Lie Yang, Palo Alto, CA (US); Meher Tendjoukian, Burlingame, CA (US); Venkatachary Srinivasan, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1734 days.

(21) Appl. No.: 11/280,746

(22) Filed: Nov. 15, 2005

(65) Prior Publication Data
US 2007/0109592 A1    May 17, 2007

(51) Int. Cl.
G06F 9/46        (2006.01)
G06F 15/16       (2006.01)
G06F 15/173      (2006.01)

(52) U.S. Cl. ........ 718/102; 718/104; 718/105; 709/201; 709/203; 709/226; 709/228; 709/249

(58) Field of Classification Search .................. 718/105, 718/102
See application file for complete search history.

(56) References Cited

U.S. PATENT DOCUMENTS

| | | |
|---|---|---|
| 4,354,230 A | 10/1982 | Murphy et al. |
| 4,631,146 A | 12/1986 | Gebauer et al. |
| 5,371,743 A | 12/1994 | DeYesso et al. |
| 5,371,882 A | 12/1994 | Ludlum |
| 5,436,960 A | 7/1995 | Campana, Jr. et al. |
| 5,440,719 A | 8/1995 | Hanes et al. |
| 5,457,478 A | 10/1995 | Frank |
| 5,475,813 A | 12/1995 | Cieslak et al. |
| 5,481,668 A | 1/1996 | Marcus |
| 5,625,757 A | 4/1997 | Kageyama et al. |
| 5,663,948 A | 9/1997 | Kobunaya |
| 5,668,943 A | 9/1997 | Attanasio et al. |
| 5,684,952 A | 11/1997 | Stein |
| 5,684,990 A | 11/1997 | Boothby |

(Continued)

FOREIGN PATENT DOCUMENTS

EP    0 144 815 A1    6/1985

(Continued)

OTHER PUBLICATIONS

Aprilog.com. (2000). "Plcc-adapter.com," located at <http://plcc-adapter.com/Site/ZIF-PLCC-to-PLCC-adapters.htm>, last visited on Dec. 7, 2005, 3 pages.

(Continued)

*Primary Examiner* — Jennifer To
(74) *Attorney, Agent, or Firm* — James J. DeCarlo; Greenberg Traurig, LLP

(57) ABSTRACT

Method and apparatus for updating user data from multiple data sources in a data gateway are disclosed. The data gateway includes a persistent job table for centrally storing jobs to be processed by the plurality of servers, a server table for centrally storing activities of the plurality of servers, and a job engine for processing job requests from the multiple data sources using the persistent job table and the server table. The data gateway includes a server farm having a plurality of servers, and where both the persistent job table and the server table reside outside the plurality of servers. The data gateway further includes a virtual Internet Protocol load balancer for dynamically mapping of jobs to be processed to particular servers according to user identifiers.

36 Claims, 6 Drawing Sheets

U.S. PATENT DOCUMENTS

| | | | |
|---|---|---|---|
| 5,727,202 A | 3/1998 | Kucala | |
| 5,742,905 A | 4/1998 | Pepe et al. | |
| 5,764,908 A | 6/1998 | Shoji et al. | |
| 5,774,668 A | 6/1998 | Choquier et al. | |
| 5,787,437 A | 7/1998 | Potterveld et al. | |
| 5,814,798 A | 9/1998 | Zancho | |
| 5,852,724 A | 12/1998 | Glenn, II et al. | |
| 5,864,653 A | 1/1999 | Tavallaei et al. | |
| 5,941,946 A | 8/1999 | Baldwin | |
| 5,956,719 A | 9/1999 | Kudo et al. | |
| 5,974,417 A | 10/1999 | Bracho et al. | |
| 6,005,860 A | 12/1999 | Anderson et al. | |
| 6,021,449 A | 2/2000 | Chow et al. | |
| 6,069,896 A | 5/2000 | Borgstahl et al. | |
| 6,092,169 A | 7/2000 | Murthy et al. | |
| 6,105,067 A | 8/2000 | Batra | |
| 6,108,779 A | 8/2000 | Dean et al. | |
| 6,134,581 A | 10/2000 | Ismael et al. | |
| 6,134,582 A * | 10/2000 | Kennedy | 709/206 |
| 6,141,690 A | 10/2000 | Weiman | |
| 6,144,999 A | 11/2000 | Khalidi et al. | |
| 6,157,944 A | 12/2000 | Pedersen | |
| 6,163,856 A | 12/2000 | Dion et al. | |
| 6,170,065 B1 | 1/2001 | Kobata et al. | |
| 6,192,396 B1 | 2/2001 | Kohler | |
| 6,236,991 B1 | 5/2001 | Frauenhofer et al. | |
| 6,243,757 B1 * | 6/2001 | Kanodia et al. | 709/235 |
| 6,256,676 B1 | 7/2001 | Taylor | |
| 6,304,981 B1 | 10/2001 | Spears et al. | |
| 6,311,187 B1 | 10/2001 | Jeyaraman | |
| 6,327,610 B2 | 12/2001 | Uchida et al. | |
| 6,327,612 B1 | 12/2001 | Watanabe | |
| 6,452,809 B1 | 9/2002 | Jackson et al. | |
| 6,457,062 B1 | 9/2002 | Pivowar et al. | |
| 6,463,032 B1 | 10/2002 | Lau et al. | |
| 6,463,463 B1 | 10/2002 | Godfrey et al. | |
| 6,477,580 B1 | 11/2002 | Bowman-Amuuah | |
| 6,489,954 B1 | 12/2002 | Powlette | |
| 6,496,858 B1 | 12/2002 | Fraillong et al. | |
| 6,496,941 B1 | 12/2002 | Segal et al. | |
| 6,505,236 B1 | 1/2003 | Pollack | |
| 6,510,050 B1 | 1/2003 | Lee et al. | |
| 6,530,083 B1 | 3/2003 | Liebenow | |
| 6,543,004 B1 | 4/2003 | Cagle et al. | |
| 6,571,354 B1 | 5/2003 | Parks et al. | |
| 6,577,905 B1 | 6/2003 | Robertson et al. | |
| 6,578,068 B1 * | 6/2003 | Bowman-Amuah | 709/203 |
| 6,596,077 B2 | 7/2003 | Myerson | |
| 6,598,068 B1 * | 7/2003 | Clark | 718/104 |
| 6,611,849 B1 | 8/2003 | Raff et al. | |
| 6,622,192 B2 | 9/2003 | Chou et al. | |
| 6,633,907 B1 | 10/2003 | Spencer et al. | |
| 6,633,910 B1 | 10/2003 | Rajan et al. | |
| 6,647,260 B2 | 11/2003 | Dusse et al. | |
| 6,654,500 B1 | 11/2003 | Lyu | |
| 6,670,982 B2 | 12/2003 | Clough et al. | |
| 6,671,824 B1 | 12/2003 | Hyland et al. | |
| 6,687,716 B1 | 2/2004 | Bradley | |
| 6,691,243 B1 | 2/2004 | Belgardt et al. | |
| 6,697,977 B2 | 2/2004 | Ozaki | |
| 6,711,579 B2 | 3/2004 | Balakrishnan | |
| 6,728,786 B2 | 4/2004 | Hawkins et al. | |
| 6,744,874 B2 | 6/2004 | Wu | |
| 6,748,570 B1 | 6/2004 | Bahrs et al. | |
| 6,751,661 B1 | 6/2004 | Geddes | |
| 6,766,469 B2 | 7/2004 | Larson et al. | |
| 6,769,124 B1 | 7/2004 | Schoening et al. | |
| 6,785,680 B1 | 8/2004 | Cragun | |
| 6,785,868 B1 | 8/2004 | Raff | |
| 6,799,224 B1 | 9/2004 | Dellacona | |
| 6,813,770 B1 | 11/2004 | Allavarpu et al. | |
| 6,822,951 B1 | 11/2004 | Patton | |
| 6,834,195 B2 | 12/2004 | Brandenberg et al. | |
| 6,839,564 B2 | 1/2005 | Sutinen et al. | |
| 6,839,744 B1 | 1/2005 | Kloba et al. | |
| 6,848,034 B2 | 1/2005 | Cohn et al. | |
| 6,853,713 B1 | 2/2005 | Fobert et al. | |
| 6,857,123 B1 | 2/2005 | Nuxoll et al. | |
| 6,859,834 B1 | 2/2005 | Arora et al. | |
| 6,865,157 B1 | 3/2005 | Scott et al. | |
| 6,865,261 B1 | 3/2005 | Rao et al. | |
| 6,865,597 B1 | 3/2005 | Bandopadhyay et al. | |
| 6,868,444 B1 | 3/2005 | Kim et al. | |
| 6,883,034 B1 | 4/2005 | Pelavin et al. | |
| 6,892,311 B2 | 5/2005 | Coppock et al. | |
| 6,895,480 B2 | 5/2005 | Heil | |
| 6,898,422 B2 | 5/2005 | Bern et al. | |
| 6,901,429 B2 | 5/2005 | Dowling | |
| 6,904,043 B1 | 6/2005 | Merchant et al. | |
| 6,931,454 B2 | 8/2005 | Deshpande et al. | |
| 6,944,662 B2 | 9/2005 | Devine et al. | |
| 6,965,929 B2 | 11/2005 | Kumar | |
| 7,000,032 B2 | 2/2006 | Kloba et al. | |
| 7,020,662 B2 | 3/2006 | Boreham et al. | |
| 7,028,312 B1 | 4/2006 | Merrick et al. | |
| 7,051,087 B1 | 5/2006 | Bahl et al. | |
| 7,051,088 B2 | 5/2006 | Sesek | |
| 7,085,822 B1 | 8/2006 | Donatelli et al. | |
| 7,085,824 B2 | 8/2006 | Forth et al. | |
| 7,089,259 B1 | 8/2006 | Kouznetsove et al. | |
| 7,089,297 B1 | 8/2006 | Salas et al. | |
| 7,093,006 B2 | 8/2006 | Sanjeev et al. | |
| 7,197,547 B1 * | 3/2007 | Miller et al. | 709/223 |
| 7,209,964 B2 * | 4/2007 | Dugan et al. | 709/223 |
| 7,222,195 B2 * | 5/2007 | Das et al. | 709/249 |
| 7,293,109 B2 | 11/2007 | Ott et al. | |
| 7,487,262 B2 | 2/2009 | Cardina et al. | |
| 7,779,416 B2 * | 8/2010 | Koga et al. | 718/105 |
| 2001/0042124 A1 | 11/2001 | Barron | |
| 2001/0047402 A1 | 11/2001 | Saimi et al. | |
| 2001/0049286 A1 | 12/2001 | Hansmann et al. | |
| 2002/0016818 A1 | 2/2002 | Kirani et al. | |
| 2002/0023122 A1 * | 2/2002 | Polizzi et al. | 709/202 |
| 2002/0032020 A1 | 3/2002 | Brown et al. | |
| 2002/0039420 A1 | 4/2002 | Shacham et al. | |
| 2002/0116396 A1 | 8/2002 | Somers et al. | |
| 2002/0124114 A1 | 9/2002 | Bottom et al. | |
| 2002/0129109 A1 | 9/2002 | Nozaki et al. | |
| 2002/0133821 A1 | 9/2002 | Shteyn | |
| 2002/0161769 A1 | 10/2002 | Sutinen et al. | |
| 2002/0174180 A1 | 11/2002 | Brown et al. | |
| 2002/0194083 A1 | 12/2002 | Balabhadrapatruni et al. | |
| 2003/0004884 A1 | 1/2003 | Kitazato | |
| 2003/0018922 A1 | 1/2003 | Litwin, Jr. et al. | |
| 2003/0065717 A1 | 4/2003 | Saito et al. | |
| 2003/0074358 A1 | 4/2003 | Sarbaz et al. | |
| 2003/0081557 A1 | 5/2003 | Mettala et al. | |
| 2003/0084177 A1 | 5/2003 | Mulligan | |
| 2003/0097361 A1 | 5/2003 | Huang et al. | |
| 2003/0097381 A1 | 5/2003 | Detweiler et al. | |
| 2003/0097487 A1 | 5/2003 | Rietze et al. | |
| 2003/0130882 A1 | 7/2003 | Shuttleworth et al. | |
| 2003/0131041 A1 * | 7/2003 | Dinker et al. | 709/104 |
| 2003/0143983 A1 | 7/2003 | Crampton | |
| 2003/0145021 A1 | 7/2003 | Parkkinen | |
| 2003/0145074 A1 | 7/2003 | Penick | |
| 2003/0147219 A1 | 8/2003 | Chou | |
| 2003/0172138 A1 | 9/2003 | McCormack et al. | |
| 2003/0172139 A1 | 9/2003 | Srinivasan et al. | |
| 2003/0172175 A1 | 9/2003 | McCormack et al. | |
| 2003/0177171 A1 | 9/2003 | Brown, Jr. et al. | |
| 2003/0187996 A1 * | 10/2003 | Cardina et al. | 709/228 |
| 2003/0195922 A1 | 10/2003 | Andrews et al. | |
| 2003/0212684 A1 | 11/2003 | Meyer et al. | |
| 2003/0212739 A1 | 11/2003 | Boucher et al. | |
| 2003/0212818 A1 | 11/2003 | Klein et al. | |
| 2003/0212826 A1 | 11/2003 | Rapakko et al. | |
| 2003/0217125 A1 | 11/2003 | Brancati et al. | |
| 2004/0003132 A1 | 1/2004 | Stanley et al. | |
| 2004/0006551 A1 | 1/2004 | Sahinoja et al. | |
| 2004/0010569 A1 | 1/2004 | Thomas et al. | |
| 2004/0034692 A1 | 2/2004 | Eguchi et al. | |
| 2004/0044799 A1 | 3/2004 | Sivaraman et al. | |
| 2004/0049543 A1 | 3/2004 | Kaminsky et al. | |
| 2004/0059834 A1 | 3/2004 | Taylor et al. | |
| 2004/0078450 A1 | 4/2004 | Chen et al. | |
| 2004/0083472 A1 | 4/2004 | Rao et al. | |

| | | | | | | | |
|---|---|---|---|---|---|---|---|
| 2004/0088390 | A1 | 5/2004 | Hall et al. | EP | 1 406 458 A1 | 4/2004 | |
| 2004/0088414 | A1 | 5/2004 | Flynn et al. | EP | 1 406 458 B1 | 4/2004 | |
| 2004/0103157 | A1 | 5/2004 | Requena et al. | EP | 1 418 771 A2 | 5/2004 | |
| 2004/0133631 | A1* | 7/2004 | Hagen et al. ............... 709/203 | EP | 1 418 772 A2 | 5/2004 | |
| 2004/0143836 | A1 | 7/2004 | McCormack et al. | EP | 1 443 701 A1 | 8/2004 | |
| 2004/0151125 | A1 | 8/2004 | Holmeide et al. | JP | 5-67059 A | 3/1993 | |
| 2004/0179529 | A1 | 9/2004 | Pettey et al. | JP | 7-262104 A | 10/1995 | |
| 2004/0181580 | A1 | 9/2004 | Baranshamaje | JP | 10-308758 A | 11/1998 | |
| 2004/0199614 | A1 | 10/2004 | Shenfield et al. | JP | 2000-209254 A | 7/2000 | |
| 2004/0210450 | A1 | 10/2004 | Atencio et al. | JP | 2001-326695 A | 11/2001 | |
| 2004/0215749 | A1 | 10/2004 | Tsao | JP | 2002-198925 A | 7/2002 | |
| 2004/0225693 | A1 | 11/2004 | Ganji et al. | WO | WO-97/28505 A1 | 8/1997 | |
| 2004/0230661 | A1 | 11/2004 | Rashid et al. | WO | WO-98/59477 A1 | 12/1998 | |
| 2004/0246996 | A1 | 12/2004 | Engel | WO | WO-99/03405 A1 | 7/1999 | |
| 2004/0247090 | A1 | 12/2004 | Nurmela | WO | WO-99/61984 A1 | 12/1999 | |
| 2004/0252700 | A1 | 12/2004 | Anadakumar et al. | WO | WO-99/62268 A2 | 12/1999 | |
| 2005/0003807 | A1 | 1/2005 | Rosenfelt et al. | WO | WO-99/62268 A3 | 12/1999 | |
| 2005/0010653 | A1 | 1/2005 | McCanne | WO | WO-99/65256 A2 | 12/1999 | |
| 2005/0010667 | A1* | 1/2005 | Moriki et al. ............... 709/226 | WO | WO-99/65256 A3 | 12/1999 | |
| 2005/0015430 | A1 | 1/2005 | Rothman et al. | WO | WO-99/65256 C1 | 12/1999 | |
| 2005/0021637 | A1 | 1/2005 | Cox | WO | WO-00/67176 A3 | 11/2000 | |
| 2005/0021713 | A1* | 1/2005 | Dugan et al. ............... 709/223 | WO | WO-00/67176 C1 | 11/2000 | |
| 2005/0041652 | A1 | 2/2005 | Roy | WO | WO-01/75684 A2 | 10/2001 | |
| 2005/0043060 | A1 | 2/2005 | Brandenberg et al. | WO | WO-01/75684 A3 | 10/2001 | |
| 2005/0044187 | A1 | 2/2005 | Jhaveri et al. | WO | WO-01/97442 A2 | 12/2001 | |
| 2005/0044235 | A1 | 2/2005 | Balahura et al. | WO | WO-01/97442 A3 | 12/2001 | |
| 2005/0055698 | A1 | 3/2005 | Sasaki et al. | WO | WO-02/27547 A1 | 4/2002 | |
| 2005/0059393 | A1 | 3/2005 | Knowles | WO | WO-02/33593 A1 | 4/2002 | |
| 2005/0060355 | A1 | 3/2005 | Kadyk et al. | WO | WO-02/091224 A1 | 11/2002 | |
| 2005/0063398 | A1 | 3/2005 | Choudhury et al. | WO | WO-02/091224 C2 | 11/2002 | |
| 2005/0063543 | A1 | 3/2005 | Kayalackakom et al. | WO | WO-03/005206 A2 | 1/2003 | |
| 2005/0067482 | A1 | 3/2005 | Wu et al. | WO | WO-03/005206 A3 | 1/2003 | |
| 2005/0076086 | A1 | 4/2005 | Budd et al. | WO | WO-03/079144 A2 | 9/2003 | |
| 2005/0080891 | A1 | 4/2005 | Cauthron | WO | WO-03/079144 A3 | 9/2003 | |
| 2005/0081211 | A1* | 4/2005 | Koga et al. ............... 718/105 | WO | WO-03/083691 A1 | 10/2003 | |
| 2005/0100329 | A1 | 5/2005 | Lao et al. | WO | WO-03/102778 A2 | 12/2003 | |
| 2005/0108289 | A1 | 5/2005 | East et al. | WO | WO-03/102778 A3 | 12/2003 | |
| 2005/0198351 | A1 | 9/2005 | Nog et al. | WO | WO-2004/040470 A1 | 5/2004 | |
| 2006/0020433 | A1 | 1/2006 | Taha et al. | WO | WO-2004/044773 A1 | 5/2004 | |
| 2006/0080389 | A1* | 4/2006 | Powers et al. ............... 709/203 | WO | WO-2004/049104 A2 | 6/2004 | |
| 2006/0259511 | A1 | 11/2006 | Boerries et al. | WO | WO-2004/049104 A3 | 6/2004 | |
| 2007/0014243 | A1 | 1/2007 | Meyer et al. | WO | WO-2005/001665 A2 | 1/2005 | |
| 2007/0014244 | A1 | 1/2007 | Snrivasan et al. | WO | WO-2005/001665 A3 | 1/2005 | |
| 2007/0014277 | A1 | 1/2007 | Ebbesen et al. | WO | WO-2005/008998 A1 | 1/2005 | |
| 2007/0014278 | A1 | 1/2007 | Ebbesen et al. | WO | WO-2005/010715 A2 | 2/2005 | |
| 2007/0014300 | A1 | 1/2007 | Breuer et al. | WO | WO-2005/010715 A3 | 2/2005 | |
| 2007/0014303 | A1 | 1/2007 | Schultz et al. | WO | WO-2005/011215 A1 | 2/2005 | |
| 2007/0014307 | A1 | 1/2007 | Srinivasan et al. | | | | |
| 2007/0016632 | A1 | 1/2007 | Schulz et al. | | | | |
| 2007/0016636 | A1 | 1/2007 | Boerries et al. | | | | |
| 2007/0016646 | A1 | 1/2007 | Tendjoukian et al. | | | | |
| 2007/0016676 | A1 | 1/2007 | Breuer et al. | | | | |
| 2007/0028000 | A1 | 2/2007 | Ebbesen et al. | | | | |
| 2007/0028293 | A1 | 2/2007 | Boerries et al. | | | | |
| 2007/0038703 | A1 | 2/2007 | Tendjoukian et al. | | | | |
| 2007/0100856 | A1 | 5/2007 | Ebbesen | | | | |
| 2007/0100975 | A1 | 5/2007 | Srinivasan et al. | | | | |
| 2007/0101021 | A1 | 5/2007 | Meyer et al. | | | | |
| 2007/0101022 | A1 | 5/2007 | Schulz | | | | |
| 2007/0112880 | A1 | 5/2007 | Srinivasan et al. | | | | |
| 2008/0189379 | A1 | 8/2008 | Naick et al. | | | | |
| 2008/0270629 | A1 | 10/2008 | Yang et al. | | | | |

FOREIGN PATENT DOCUMENTS

| | | |
|---|---|---|
| EP | 0 144 815 B1 | 6/1985 |
| EP | 0 772 327 A2 | 5/1997 |
| EP | 0 772 327 A3 | 5/1997 |
| EP | 0 772 327 B1 | 5/1997 |
| EP | 0 909 058 A2 | 4/1999 |
| EP | 0 909 058 A3 | 4/1999 |
| EP | 0 909 058 B1 | 4/1999 |
| EP | 0 986 225 A1 | 3/2000 |
| EP | 1 126 387 A2 | 8/2001 |
| EP | 1 126 387 A3 | 8/2001 |
| EP | 1 221 661 A2 | 7/2002 |
| EP | 1 221 661 A3 | 7/2002 |
| EP | 1 280 314 A2 | 1/2003 |
| EP | 1 296 252 A1 | 3/2003 |
| EP | 1 296 252 B1 | 3/2003 |

OTHER PUBLICATIONS

Barbir, A. et al. (Jul. 2003). "RFC 3568: Known Content Network (CN) Request-Routing Mechanisms," located at <http://www.faqs.org/rfcs/rfc3568.html>, last visited on Dec. 6, 2005, 14 pages.

Cherniak, M. et al. (Sep. 11, 2001). "Data Management for Pervasive Computing," VLDB, Rome, Italy, pp. 71-140.

Core Solutions. (Date Unknown). "IT Device Repair (ITDR)," 1 page.

Coulouris, G. et al. (1994). *Distributed Systems: Concepts and Design*. Second Edition, Addison-Wesley Publishing Company, pp. 222-233, 311-318.

Ericsson et al. (Oct. 2, 2002). "SynML Sync Protocol, Version 1.1.1," located at <http://www.syncml.org/docs/syncml_sync_protocol_v111_20021002.pdf>, 53 pages.

Expand Networks. (Apr. 2004). "The Role of Accelerators in Disaster Recovery: Enabling Cost-Effective, High-Performance Backup Networks," 8 pages.

Geekmail, Inc. (2003). "Geekmail—IMAP, Anti-Spam Email Hosting," located at <http://web.archive.org/web/20040401200823/www.geekmail.com/home/>, last visited on Dec. 7, 2005, 3 pages.

International Preliminary Report on Patentability mailed on Jan. 16, 2008 for PCT Application No. PCT/US2006/023533 filed on Jun. 16, 2008, five pages. (20019.40).

International Preliminary Report on Patentability mailed on Mar. 4, 2008, for PCT Application No. PCT/US2006/026304, filed on Jul. 6, 2006, ten pages. (20009.40).

International Search Report mailed Jul. 11, 2003, for PCT Application No. PCT/US03/07180 filed Mar. 11, 2003, 1 page.

International Search Report mailed Jun. 23, 2003, for PCT Application No. PCT/US03/07179 filed Mar. 11, 2003, 1 page.

International Search Report mailed Oct. 1, 2003, for PCT Application No. PCT/US03/07182 filed Mar. 11, 2003, 2 pages.

International Search Report mailed Oct. 8, 2003, for PCT Application No. PCT/US03/07181 filed Mar. 11, 2003, 1 page.

International Search Report mailed Oct. 18, 2004, for PCT Application No. PCT/US04/02033 filed Jan. 21, 2004, 1 page.

International Search Report and Written Opinion mailed on Dec. 5, 2006, for PCT Application No. PCT/US06/23533, five pages.

International Search Report and Written Opinion mailed on Feb. 21, 2008, for PCT Application No. PCT/US06/23535, eleven pages.

International Search Report and Written Opinion mailed on May 22, 2008, for PCT Application No. PCT/US2006/026304, filed on Jul. 6, 2006, eighteen pages.

Kozierok, C.M. (Sep. 20, 2005). "The TCP/IP Guide," located at <http://www.tcpipguide.com/free/index.htm>, last visited on Dec. 6, 2005, 3 pages.

Mailgov. (Date Unknown). "Product Features," located at <http://web.archive.org/web/20040607035920/http://mailgov.com/product_features.php>, last visited on Dec. 7, 2005, 1 page.

Meeting Maker, Inc. (2005). "Meeting Maker Features & Benefits," located at <http://www.meetingmaker.com/products/meetingmaker/features_benefits.cfm>, last visited on Dec. 7, 2005, 3 pages.

Motorola, Inc. (May 7, 2003). "Managed Services Solutions For Federal Government Agencies," located at <http://www.motorola.com/governmentandenterprise/contentdir/en_US/Files/SolutionInformation/FEDWhitePaperOverview.pdf>, last visited on Dec. 12, 2005, 8 pages.

Mykkänen et al. (2004). "Component and Service Technology Families," University of Kuopio, pp. 57-59.

Neon Software, Inc. (1993-2002). "LANSurveyor® Version 7 User's Manual," located at <http://www.neon.com/Manuals/LANsurveyor7.manual.pdf>, 244 pages.

Notable Solutions, Inc. (Date Unknown). "Methods of Routing Documents with AutoStore," 2 pages.

Oracle. (2005). "Oracle9i Lite: Data Sheet," located at <http://www.oracle.com/technology/products/lite/htdocs/o9ilite_datasheet/htm>, last visited on Dec. 6, 2005, 5 pages.

Oracle. (Mar. 2002). "Oracle9i: Recovery Manager Reference," 292 pages.

PeopleCube. (2005). "Meeting Maker Features & Benefits," located at <http://www.meetingmaker.com/products/meetingmaker/features_benefits.cfm>, last visited on Dec. 7, 2005, 3 pages.

Schuba, C. et al. (May 2005). "Integrated Network Service Processing Using Programmable Network Devices," Sun Microsystems, Inc. Technical Report, 30 pages.

VocalTec Communications Ltd. (Jul. 2004). "Essentra™ Product Suite: General Description," 16 pages.

Wildgate Wireless™. (Date Unknown). "How Cool Can Email Get?," located at <http://www.wildgate.com/Register_Pages.Email.htm>, last visited on Dec. 7, 2005, 1 page.

Yau, D. et al. (Date Unknown). "Extensible Network Security Services on Software Programmable Router OS," located at <http://www.cerias.purdue.edu/news_and_events/events/sympoisum/2001/posters/post_49.pdf>, 18 pages.

Youngtech, Inc. (Date Unknown). "Disaster Recovery," located at <http://www.youngtech.com/documents/DisasterRecovery.pdf>, last visited Dec. 6, 2005.

\* cited by examiner

DATA GATEWAY FOR JOBS MANAGEMENT BASED ON A PERSISTENT JOB TABLE AND A SERVER TABLE

FIELD OF THE INVENTION

The present invention relates to the field of data communication over the Internet. In particular, the present invention relates to a data gateway.

BACKGROUND OF THE INVENTION

The recent proliferation of electronic devices for communication, information management and recreation has moved routine computing power away from the desk-bound personal computer. Users are using devices such as cell phones, camera phones, personal digital assistants (PDAs) and navigation systems, not only in the office and in the home, but also in the field and on the road. There is a diverse range of possible applications for such devices, including communication, business, navigation, entertainment and even managing basic daily activities. Many users today only use a single device for a single task, for example, using cell phones for making and receiving phone calls. However, these devices are no longer single-function devices. They are capable of creating various types of data, for instance, electronic mail, voice messages, photos, video, etc. Increasing the number of functions of a device increases the level of personalization to the users. It is desirable to provide users a connected-service to connect and access their data wherever they are, with whatever device they are using and whatever service they are connected to.

A conventional data gateway for handling millions of user devices with different data sources, such as IMAP, POP, WebDAV Exchange, is by employing a server farm with multiple gateway servers. Each gateway server in the server farm maintains a persistent storage for handling job requests of updating changes of users' data. However, this conventional data gateway has a number of problems. One of the problems of the conventional data gateway is to provide failover support. When a server in the server farm fails or is inactive for a period of time, the system needs to transfer the job requests assigned to the failed server to other servers in the farm without losing the job requests. Thus, there is a need for a system that can transfer job requests from a failed server to other servers in the farm seamlessly.

Another problem of the conventional data gateway is to provide a scalable system to support a growing user base. When a particular server farm runs out of capacity, it would be difficult to transfer the persistent storage of job requests to a new server farm as the job requests stored in the persistent storage may be at different stages of processing. Thus, there is a need for a system that can scale as the user base grows.

Yet another problem of the conventional data gateway is to process job requests in an efficient manner. Since a user's job requests are not consistently sent to a particular server in the server farm, the user's account data need to be transferred and cached in multiple servers where the job requests are processed, which leads to additional use of data gateway resources. Therefore, there is a need for a system that can consistently send a user's job requests to a particular server such that the user's account data may be cached and efficiently used for subsequent job requests from the user.

SUMMARY OF THE INVENTION

In one embodiment, a data gateway for updating user data from multiple data sources includes a persistent job table for centrally storing jobs to be processed by the plurality of servers, a server table for centrally storing statuses of activities of the plurality of servers, and a job engine for processing job requests from the multiple data sources using the persistent job table and the server table. The data gateway includes a server farm having a plurality of servers, and where both the persistent job table and the server table reside outside the plurality of servers. The data gateway further includes a virtual Internet Protocol load balancer for dynamically mapping of jobs to be processed to particular servers according to user identifiers.

In another embodiment, a method for updating user data from multiple data sources in a data gateway includes receiving a job request at the data gateway, fetching jobs due for processing from a persistent job table, sending the jobs to a storage queue, rescheduling the jobs in the persistent job table for processing at a future time, dispatching a job to be processed from the storage queue to a job handler, and processing the job by the job handler according to a data source type of the job. The data gateway includes a server farm having a plurality of servers. The persistent job table stores jobs to be processed by the plurality of servers and resides outside the plurality of servers.

BRIEF DESCRIPTION OF THE DRAWINGS

The aforementioned features and advantages of the invention as well as additional features and advantages thereof will be more clearly understandable after reading detailed descriptions of embodiments of the invention in conjunction with the following drawings.

Like numbers are used throughout the specification.

DESCRIPTION OF EMBODIMENTS

The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description which follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
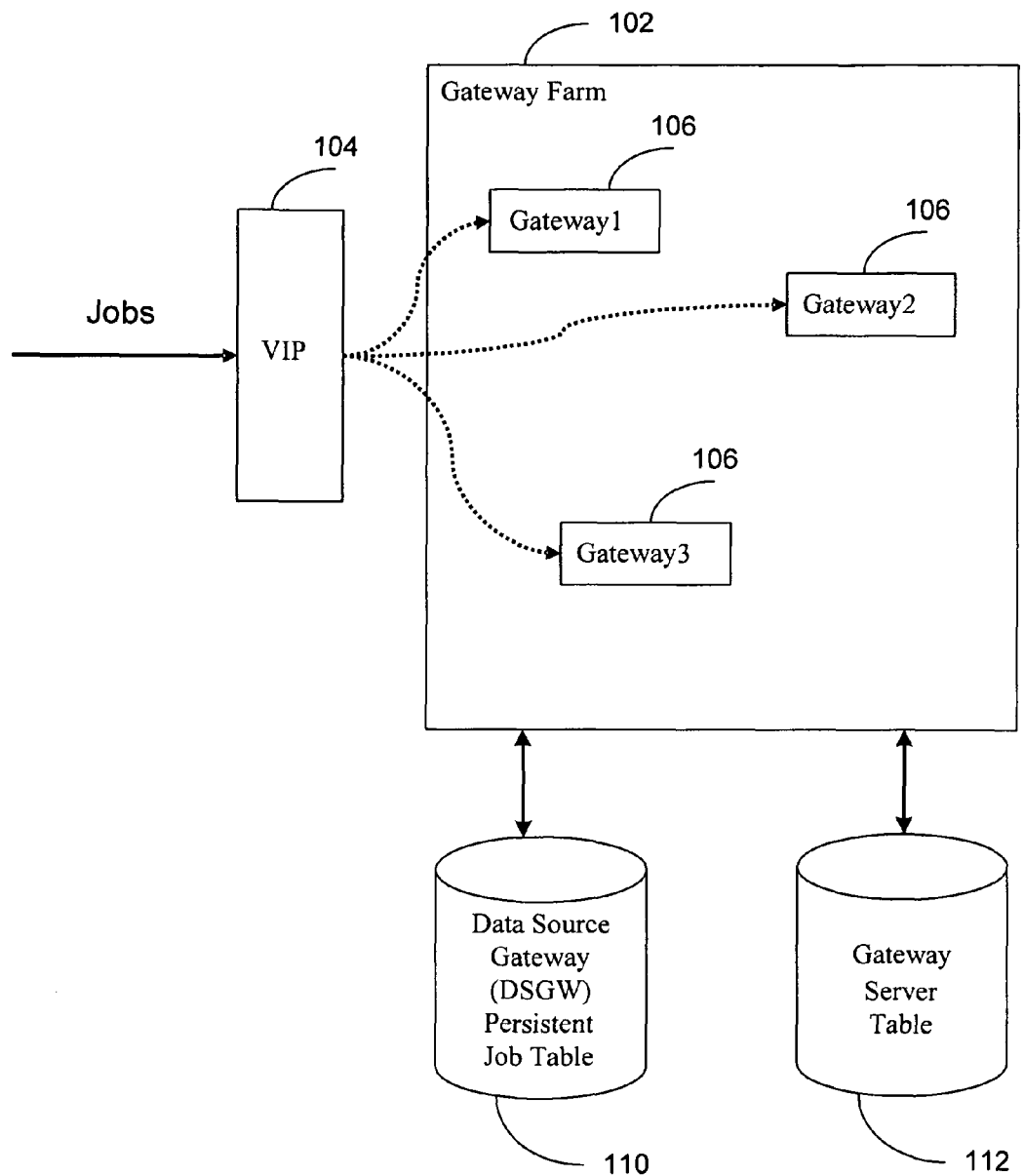
FIG. 1 illustrates a gateway farm of servers supported by a virtual Internet Protocol load-balancer according to an embodiment of the present invention.

FIG. 1 illustrates a gateway farm of servers supported by a virtual Internet Protocol load-balancer according to an embodiment of the present invention. In this case, a gateway farm 102 is a group of server machines running the Data Source Gateway, Content Router, and SyncML server components. The Content Router is described in U.S. application Ser. No. 11/182,287, entitled "Content Router," to Torsten Schulz et al., which is hereby incorporated by reference in its entirety. The SyncML server is described in U.S. application Ser. No. 11/273,891, entitled "Data Synchronization and Device Handling," to Yang et al., which is hereby incorporated by reference in its entirety.

Jobs to be processed by the gateway farm 102 of servers are received through a virtual Internet Protocol load balancer (VIP) 104, which serves as a front-end interface for the gateway farm. The gateway farm 102 may include one or more gateway servers 106. In addition, the gateway farm 102 is supported by a data source gateway (DSGW) persistent job table 110 and a gateway server table 112. The VIP performs load-balancing requests from client devices to a cluster of machines running behind the VIP load-balancer, where IP means the Internet Protocol address of a machine.

A P_Value is a hash value that is computed from the user's login, such as from a Yahoo ID. This value is computed and padded to a length of 24 characters. The VIP uses this value to create a mapping from the P_Value to a particular gateway host. If a mapping exists, it assigns all jobs with a given P_Value to the corresponding host in the mapping table. The P_Value is generated when the default (primary account where data is aggregated) user account is provisioned. When a new data account (like POP, WebDAV Exchange, etc) is added, a P_Value of the primary account is assigned to it. The P_Value is part of requests received from client devices to the gateway farm. The VIP for the gateway farm is configured to search for a name that matches the name value pair in the HTTP query string. It searches for a string "p=" followed by 24 characters. It uses this value to compute the P hash and assigns the request to an appropriate gateway server behind the VIP.

Note that as long as the servers behind the VIP in the gateway farm are up and running, and are not heavily loaded, it is guaranteed that requests for a given user are directed to and handled by the same machine in the server farm. This method provides at least two advantages. First, since all the requests for a given user are handled by the same machine, job information for the user can be cached on that machine, thus the performance of handling user requests may be improved. Second, in case of handling failover of a gateway server in the gateway farm, it is guaranteed that the repeated or recurring jobs are handled by the same server machine as new notifications received from client devices.

In one embodiment, the VIP implements a gateway job scheduling algorithm that ensures partitioning of the user cache and Open Systems Interconnection (OSI) layer-7 stickiness. The OSI for computer communications supports a 7-layer model as listed: Application, Presentation, Session, Transport, Network, Data Link, and Physical. The Transport layer is the layer that provides reliable communication between two systems. The layers above the Transport layer can assume that they have an error-free communications link. The Presentation layer relates to the representation of data that is being exchanged between two systems. The Session layer provides services to applications running about it. Two of the important services it provides are establishing a session and releasing a session. The Application Layer (Layer-7) is used to communicate application data between two systems. Examples of the Application Layer are Electronic Mail, Directory Services, Virtual Terminal, File Transfer, etc.

The Layer-7 stickiness ensures that devices and clients communicating with the connected data source gateways are not suddenly shifted from one gateway server to the other in the gateway server farm by the VIP. This guarantees that during a session a device/client will go to the same gateway host in the farm. This allows the gateway to cache information on a particular gateway for a given user or device thus improving the performance and balancing the processing/data load on the gateways in the farm. The P_Value, which is included in every request sent to the gateway, is used in maintaining the layer-7 stickiness and load-balancing of the data synchronization job requests. This includes jobs that come from outside the system (for example data change notifications from devices and/or registered data sources) and jobs that get rescheduled from the gateway job table, such as recurring jobs and delayed jobs (for example job delayed due to temporary error or as a result of the appropriate lock not being available).

Therefore, the P_Value, Layer-7 stickiness and the VIP are employed to ensure 1) high availability of the data gateway by automatically bypassing gateway servers that are down and thus ensuring that a user never experiences a service down time; 2) intelligent load-balancing of the data gateway by routing requests to those servers that have processing bandwidth; and 3) session stickiness by guarantee that a given user/device requests are handled on the same gateway in the farm no matter where they come from.

The following example further describes the functions of the VIP discussed above. Initially, all three gateway machines (Gateway1, Gateway2 and Gateway3) are assumed to be up and running with the following P_Value and gateway host mapping in the VIP. The P_Value specifies the P-hash value computed from the Yahoo ID of the primary data source account for a given user account, and the Gateway Host specifies the gateway host that is the current owner of the job.

TABLE 1A

| P_Value | Gateway Host |
| --- | --- |
| P1 | Gateway1 |
| P2 | Gateway2 |
| P3 | Gateway3 |
| P4 | Gateway1 |
| P5 | Gateway2 |

As shown in Table 1A, Gateway1 handles jobs for users with P_Values P1 and P4; Gateway2 handles jobs for users with P_Values P2 and P5; and Gateway3 handles jobs for users with P_Value P3.

Next, assume that Gateway1 goes down and does not come back up for a predetermined period of time. In this case, the VIP performs load-balancing and modifies the P_Value to Gateway Host mapping as follows.

TABLE 1B

| P_Value | Gateway Host |
|---------|--------------|
| P1 | Gateway3 |
| P2 | Gateway2 |
| P3 | Gateway3 |
| P4 | Gateway2 |
| P5 | Gateway2 |

As shown in Table 1B, Gateway2 handles jobs for users with P_Values P2, P4 and P5, and Gateway3 handles jobs for users with P_Values P3 and P1. In this case, the Gateway2 and Gateway3 update the VIP mapping (P_Value to Gateway host) they infer when they receive a new request via the VIP from a device or data source.

Next, assume that Gateway1 comes back up after a certain period of time. The VIP updates the (P_Value to gateway host) mapping when it performs load-balancing, assuming the following are resulted in the VIP after mapping.

TABLE 1C

| P_Value | Gateway Host |
|---------|--------------|
| P1 | Gateway3 |
| P2 | Gateway2 |
| P3 | Gateway1 |
| P4 | Gateway2 |
| P5 | Gateway1 |

In this case, Gateway1 handles jobs for users with P_Values P3 and P5; Gateway2 handles jobs for users with P_Values P2 and P4; and Gateway3 handles jobs for users with P_Values P1. Note that Gateway1, Gateway2 and Gateway3, respectively, update the VIP mapping they infer based on requests received via the VIP (from devices and data sources).

The method ensures the network layer-7 stickiness established by the VIP is maintained when processing jobs in the gateway farm. There are at least three advantages. First, it guarantees that new job requests received from outside (from devices or data sources) and rescheduled jobs in the gateway farms will be handled by the same gateway host. This improves the efficiency of job handling because the method takes advantage of user information that may already be cached on a dedicated gateway host. Second, it prevents cached user data from spreading across the gateway farm servers, thus reduces memory usage and improves performance of the data source gateway. Third, the method ensures proper load-balancing for failover support and it improves the scalability of the system.

Table 1D shows an example of a job table that maintains the jobs to be processed by the data source gateway.

TABLE 1D

| UserID | P_Value | Job | GatewayHost | Timestamp |
|--------|---------|-----|-------------|-----------|
| User1 | P1 | Mail | Gateway3 | 1347103427 |
| User2 | P2 | Calendar | Gateway2 | 1431234137 |
| User3 | P3 | AddressBook | Gateway1 | 1453241323 |
| User1 | P1 | Mail.LongPoll | Gatway3 | 1432342322 |
| User2 | P2 | Mail.LongPoll | Gateway2 | 1312222222 |

In this case, when the gateway receives a job request via the VIP, it determines whether there is a mapping from the P_Value to a particular gateway. If such mapping does not exist, it creates a new mapping. If such a mapping exists, the job scheduler makes a second determination whether the mapping has changed. If the mapping has not changed, the job scheduler continues processing this job. If the mapping has changed, the job scheduler updates the mapping and changes the gateway host entry for all rescheduled jobs in the persistent job table store. This ensures that the gateway infers dynamic VIP mapping of the P_Values to establish layer-7 stickiness with the new servers. As a result, the subsequent jobs of the same users are sent to the same new servers for processing via the VIP.

Table 1E illustrates the use of parameters RetryCount and RescheduleFlag in the persistent job table according to an embodiment of the present invention and the parameters of the persistent job table are described below:

TABLE 1E

| ExtUserID | Datasource Type | Job Type | Server | Retry Count | Due Time | Reschedule |
|-----------|-----------------|----------|--------|-------------|----------|------------|
| User1 | Yahoo | Mail | Gateway1 | 0 | 1131993562971 | 0 |
| User1 | Yahoo | Calendar | Gateway1 | 0 | 1131994101734 | 0 |
| User2 | Exchange | Mail | Gateway2 | 0 | 1131994101734 | 1 |
| User3 | IMAP | Mail-Poll | Gateway2 | 0 | 1131993801595 | 0 |
| User4 | Yahoo | Calendar | Gateway3 | 2 | 1131999801595 | 0 |

Persistent_Job_Table (ExtUserID, DatasourceType, JobType, Server, RetryCount, DueTime, RescheduleFlag)
Where
ExtUserID: is a unique ID identifying a given user's entries in the job table.
DatasourceType: specifies the data source account (example: YAHOO, Exchange, IMAP, POP etc)
JobType: specifies the gateway data synchronization jobs. Examples are Mail, Calendar, AddressBook, Mail-poll, Calendar-poll, etc.
Server: specifies the gateway server currently owning the job.
RetryCount: is the number of times the gateway has tried processing this job as a result of temporary error.
DueTime: specifies the next time this job needs to be processed.
RescheduleFlag: indicates the gateway has received another notification for a job that is currently being processed.

Note that the purpose of the RetryCount is to ensure that jobs that fail often due to temporary errors do not monopolize the gateway resources. This parameter is used by the job dispatcher to reschedule the job with an incremental delay. This ensures that all jobs have a fair opportunity in getting processed. Also, when the RescheduleFlag is set, the gateway may reschedule the job. This flag ensures that any change notification the gateway received will not be lost.

Figure 2:
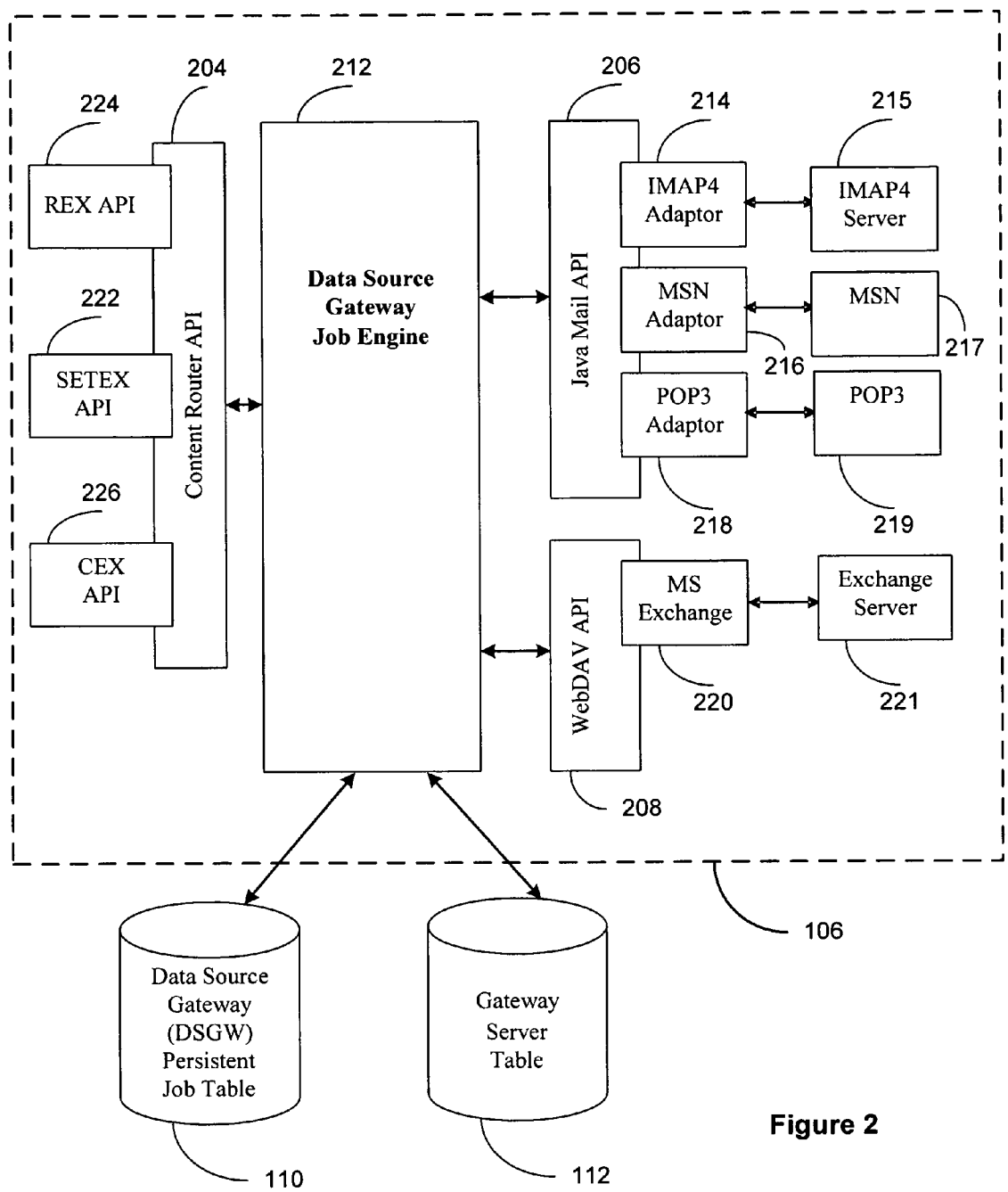
FIG. 2 illustrates a data source gateway according to an embodiment of the present invention.

FIG. 2 illustrates a data source gateway according to an embodiment of the present invention. The data source gateway includes a Content Router API 204, Java Mail API 206, WebDAV API 208, and a data source gateway (DSGW) job engine 212. The Java Mail API 206 includes IMAP4 adaptor 214, MSN adaptor 216, and POP3 adaptor 218 for communicating to IMAP4 server 215, MSN server 217, and POP3 server 219, respectively. The WebDAV API 208 includes an MS Exchange adaptor 220 for communicating with an Exchange server 221. The DSGW job engine 212 provides the logic for accessing data sources. The data source gateway inventory includes a list of data source accounts, folder, and folder item information and individual data type information, such as mail, PIM, etc. The folders may be mail or PIM folders. This information is accessed by the DSGW job engine 212 to determine the data synchronization state when servicing a request for data from the data source. The gateway server table 112 includes a list of gateway servers and their corresponding last job schedule timestamps for that server. The gateway uses the settings exchange (SETEX) API 222 to exchange the folder list and meta-data information with the Content Router. On the other hand, new mail and PIM information are exchanged with the Content Router using the records exchange (REX) API 224. Attachments are sent using the commands exchange (CEX) API 226 to the Content Router. These accounts are accessed by the gateway module when processing incoming mail meta-data modifications (folder filing, read status, etc), and new mails from the device are delivered back to the mail gateway and forwarded to the mail data source accordingly. In other embodiments, additional message body and attachment tables may be introduced to allow attachments and full bodies to be delivered to devices without additional communications with the mail servers.

Figure 3:
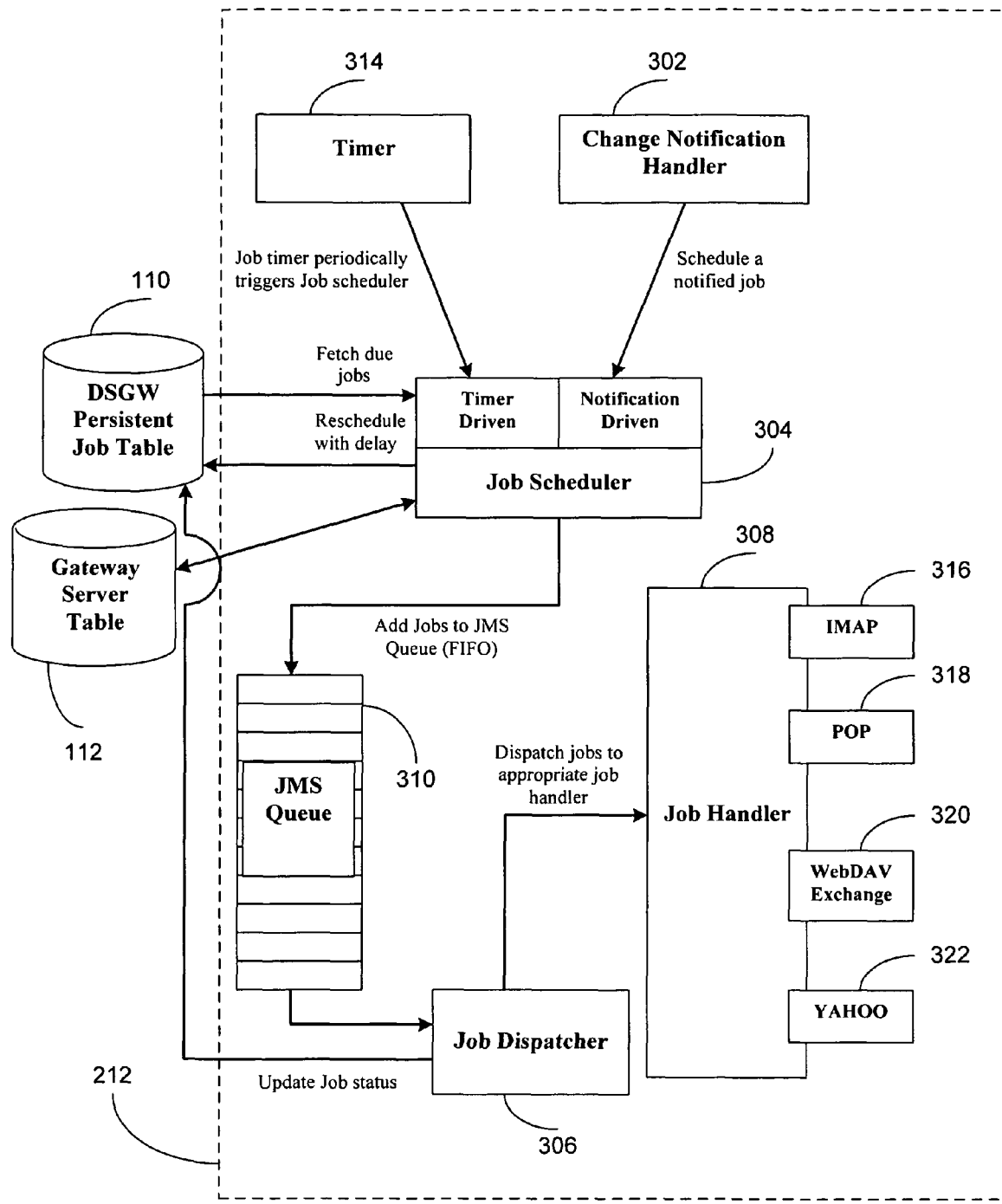
FIG. 3 illustrates a block diagram of the data source gateway job engine according to an embodiment of the present invention.

FIG. 3 illustrates a block diagram of the data source gateway job engine according to an embodiment of the present invention. As shown in FIG. 3, the DSGW job engine includes a change notification handler 302, a job scheduler 304, a job dispatcher 306, a job handler 308, a JMS queue 310. In addition, the DSGW job engine communicates with the DSGW persistent job table 110 and the gateway server table 112.

Jobs may be added to the DSGW job engine via the change notification handler 302. The change notification handler 302 can receive change notification requests from the devices or from registered backend data sources (YAHOO, IMAP, POP, WebDAV Exchange, etc). In each of these cases, the change notification handler 302 adds jobs to be consumed by the job dispatcher to the JMS queue 310 (to be dispatched for processing) and reschedule them for re-processing at a later time as an assurance against job loss due to a server crash or a server internal error in a distributed server environment. The JMS queue is a first-in-first-out (FIFO) memory storage device. Another way jobs are added to the DSGW job engine is via the job dispatcher 306, which reschedules repeated jobs and delayed, which include jobs that failed due to a temporary error or jobs that were not processed since an appropriate data type lock was not available.

The job scheduler 304 schedules a change request job by adding it to the JMS queue 310. These jobs are picked up by the job dispatcher 306 and dispatched to the appropriate job handler 308 for processing the change request. After the job handler completes processing the change request, it returns a job completion status to the job dispatcher. If the job is successfully completed and it is not a recurring job, it is then removed from the DSGW persistent job table. On the other hand, if the job is a recurring job or if the job handler returns a busy or temporary status, the job is then rescheduled in the DSGW persistent job table 110 for processing at a later time. The job scheduling and dispatch process is further explained in the following sections.

The job scheduler schedules jobs in one of two ways. One way is by picking-up jobs from the DSGW persistent job table 110 when it is triggered periodically by the timer 314, which is also known as timer-driven job scheduling. Another way is triggered by the change notification handler 302 to process change notifications from the devices and from registered data sources.

Figure 4:
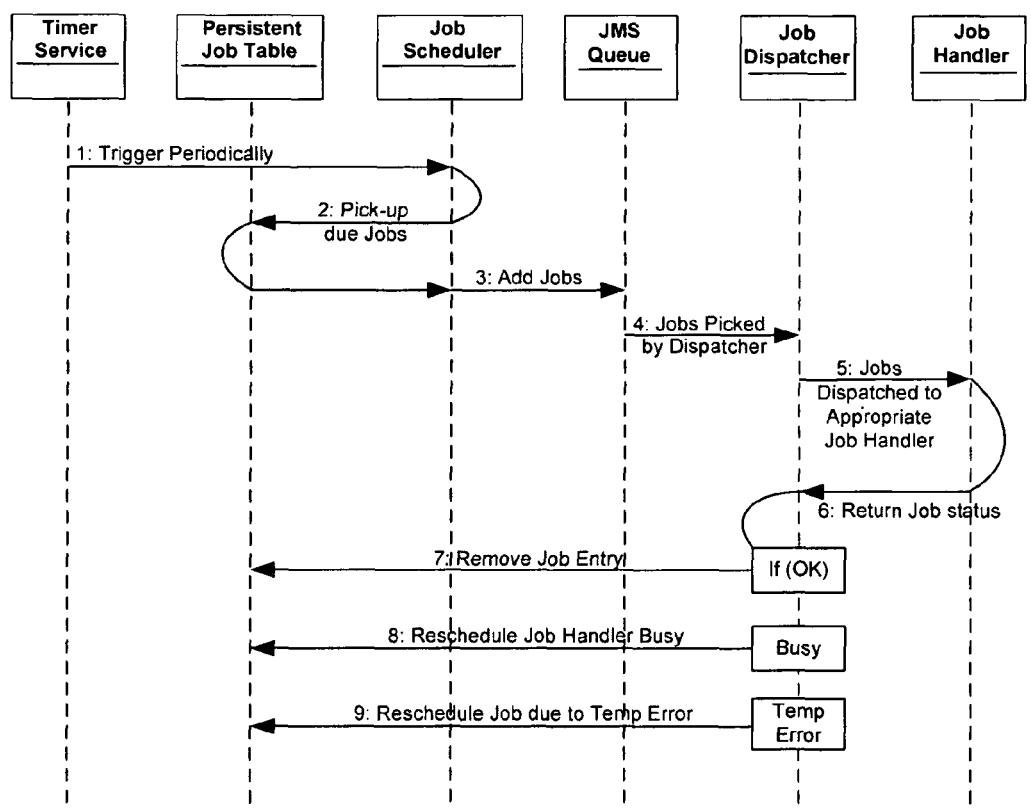
FIG. 4 illustrates a sequence diagram of timer-driven job scheduling according to an embodiment of the present invention.

FIG. 4 illustrates a sequence diagram of timer-driven job scheduling according to an embodiment of the present invention. In this case, the gateway job engine handles the processing of recurring jobs and delayed jobs, which include jobs rescheduled as a result of temporary error, jobs delayed since a lock was not available for a given data type, or jobs not processed as a result of server crash. The steps shown in FIG. 4 are further described below:

1. The gateway job engine timer goes off at periodic intervals and triggers the job scheduler.
2. The job scheduler queries the persistent job table for all the jobs that are due or overdue for processing for which it is the owner.
3. The selected jobs are added to the first-in-first-out (FIFO) JMS Queue and are also rescheduled in the persistent job table for processing at a future time as an assurance against job loss due to server crash or server internal error.
4. Jobs added to the JMS Queue are picked up in a first-in-first-out order by the job dispatcher.
5. The job dispatcher then dispatches each job to an appropriate job handler based on the data source type.
6. The job handler processes each job and returns a completion status to the job dispatcher.
7. If the status returned indicates the job has been completed, the job dispatcher removes the job from the persistent job table if it is a one-time job and reschedules the job if it is a recurring job.
8. If the status returned indicates a busy-lock taken, the job is delayed for processing at a later time.
9. If the job completion status returned indicates a temporary error, the job dispatcher increments the retry count and reschedules the job with an exponential delay to prevent a job from excessive use of the gateway resources.

The DSGW persistent job table 110 is a centralized persistent job store that is essential for preventing job loss and enabling job failover support in the data source gateway. There is one such persistent job table for each gateway farm, which includes multiple load-balanced gateway servers behind a VIP. The job scheduler also adds jobs to the persistent job table with a delayed reschedule time when adding jobs to the JMS queue as an assurance against job loss. This step ensures that even if the data source gateway crashes or is overloaded, the jobs are picked-up by other gateway servers in the farm, thus giving the end-user an un-interrupted data synchronization service.

The following steps describe the job scheduler uses the gateway server table in handling failover of a server according to an embodiment of the present invention.

1. The gateway job scheduler running on a particular gateway is periodically triggered to pick-up jobs for which it is the current owner and that are due or overdue for processing from the persistent job table.
2. It then updates the last job reschedule timestamp for the current gateway in the gateway server table. This step is used for failover support.
3. It schedules the jobs in the JMS queue for processing and also reschedules the jobs in the persistent job table for processing at a later time. This step is an assurance against job loss due to server crash or internal errors.
4. The job scheduler then queries the gateway server table to retrieve a list of all gateway servers that have not updated their last job reschedule timestamps within the failover time interval. The gateway servers that have not updated the timestamps within the failover interval are referred to as inactive servers.

5. The job scheduler then picks up the jobs that are due and owned by the inactive servers and reschedules them via the VIP specifying the P_Value for each rescheduled job. This ensures that the failover jobs will be processed on the same gateway as new jobs being sent via the VIP to a corresponding gateway thereby maintaining layer-7 stickiness of the jobs to be processed.

The change notification handler 302 schedules jobs by invoking the job scheduler 304 when it receives change notifications from client devices or from registered data source servers, such as Yahoo, IMAP, POP or WebDAV Exchange. The change notification jobs are then added to the JMS queue 310 and are also added to the DSGW persistent job table 110 to be processed at a later time. In this case, the jobs are added to the DSGW persistent job table to ensure recovery in the event of server crash or unavailability of the data source server.

Figure 5:
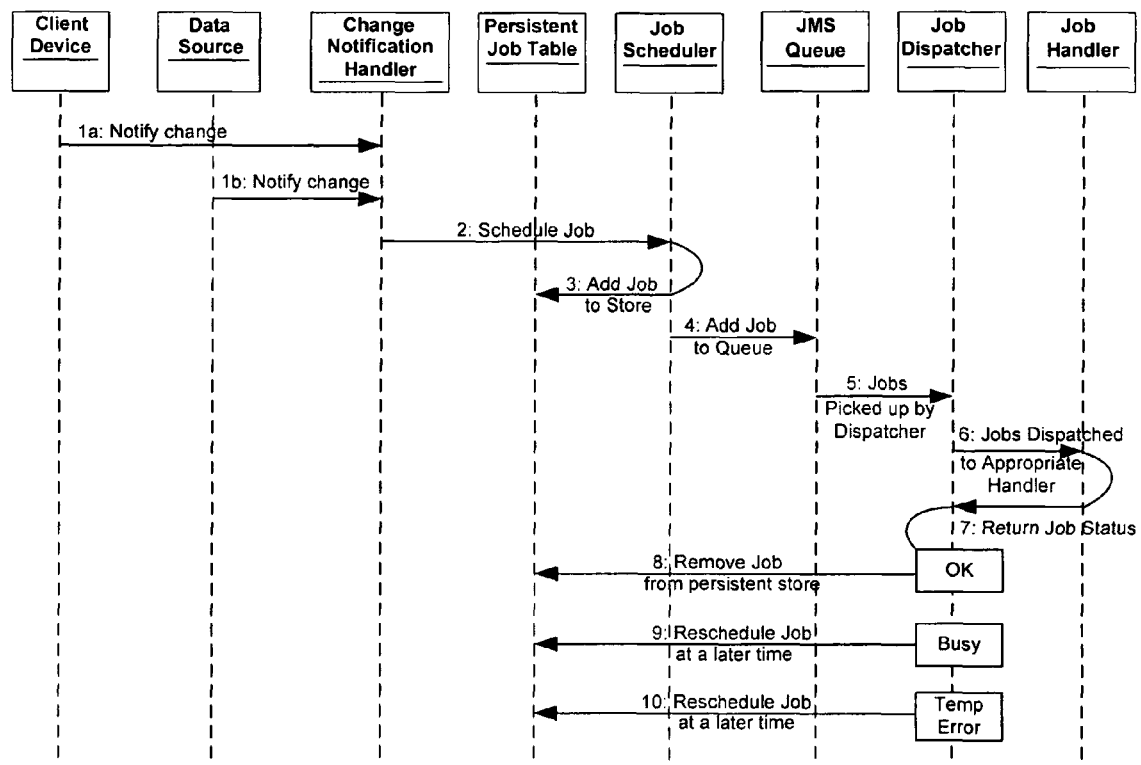
FIG. 5 illustrates a sequence diagram of a job dispatcher according to an embodiment of the present invention.

FIG. 5 illustrates a sequence diagram of a job dispatcher according to an embodiment of the present invention. The sequence diagram describes the process for dispatching a DSGW job, which is a data synchronization job, to keep the data between the devices and the target data sources in synchronization to the appropriate data source gateway component for further processing. The steps shown in FIG. 5 are described below:

1. The gateway change notification handler receives a data change notification from a device (such as a PDA). The data changed may be new mails to be sent, mail flag changes, new PIM data, etc. Alternatively, the gateway change notification handler may receive a data change notification request from a backend data source (such as Yahoo Mail, Yahoo Calendar etc). The data changed may be new mails, deleted mails, change in flags, etc.
2. The change notification handler invokes the job scheduler to schedule the job for processing.
3. The job scheduler first adds the job request to the persistent job table as an assurance against job loss.
4. The job scheduler then adds the job to the JMS Queue for processing by the job dispatcher.
5. The job dispatcher picks up the jobs from the JMS queue in a first-in-first-out order.
6. The job dispatcher obtains an appropriate lock for the job to be processed and dispatches it to an appropriate job handler based on the data source type.
7. The job handler processes the job and returns the completion status to the job dispatcher.
8. If the status returned indicates the job has been completed, the job dispatcher removes the job if it is a one-time job and reschedules the job at an appropriate time interval if it is a periodic recurring job.
9. If the status returned indicates a busy-lock taken, the job is delayed for processing at a later time and the persistent job table is updated.
10. If the job completion status returned indicates a temporary error, the job dispatcher increments the retry count and reschedules the job with an exponential delay to prevent a job from excessive use of the gateway resources.

The job handler 308 processes the change notification or data synchronization job dispatched by the job dispatcher 306. It uses the information received in the dispatched job to invoke an appropriate job handler to complete processing the data synchronization job with the backend data source servers. The job handler further implements a hierarchical gateway job-locking scheme to enable concurrency while maintaining data integrity when processing jobs for different data types (for example mail, calendar, etc) of the same data source type (for example Yahoo, Exchange, and IMAP). The hierarchical gateway job-locking scheme is further explained with the help of various lock-request scenarios.

Figure 6:
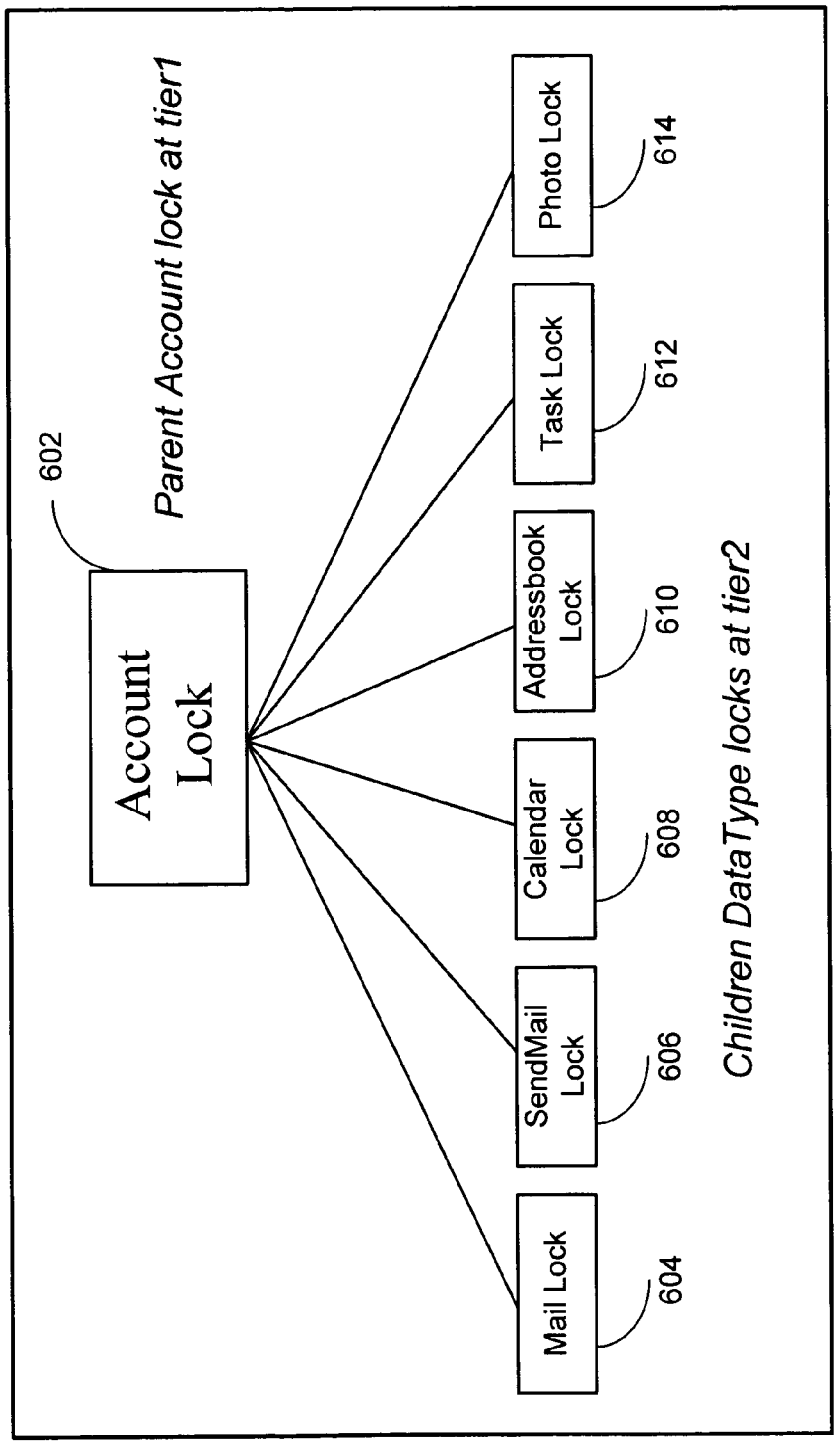
FIG. 6 illustrates a hierarchical gateway job-locking scheme according to an embodiment of the present invention.

FIG. 6 illustrates a hierarchical gateway job-locking scheme according to an embodiment of the present invention. As shown in FIG. 6, the hierarchical gateway job-locking scheme implements a multi-tier locking mechanism with an Account lock 602 as a parent in tier one, and multiple DataType locks as children of the Account lock at tier two. Note that there can only be one Account lock per data source account. An Account lock is used to obtain a mutually exclusive write access to perform an update of the user's account information. Examples of account jobs are: 1) provision user account, 2) update user account configuration, 3) delete user account, and 4) de-activate user account.

The data source gateway supports multiple DataType locks per account, one for each data type (for example mail, calendar, etc) supported by the data source type (such as Yahoo, Exchange, IMAP, and POP). In this case, the DataType locks include mail lock 604, sendmail lock 606, calendar lock 608, addressbook lock 610, task lock 612, and photo lock 614. Taking a DataType lock is equivalent to taking a read lock on the parent Account lock at tier1, and a write lock on the specific DataType lock, for example mail lock, calendar lock, and addressbook lock, at tier2.

In one approach, an Account lock scheme includes the following parameters: (ExtUserID, AccJobType, AccServer, AccTimestamp, LockFlags), where ExtUserID: is the unique user identifier that identifies the data source account.

AccJobType: is the account job that has taken the lock (e.g. provision)

AccServer: is the gateway instance that holds the Account lock (i.e. is the IP address of the gateway)

AccTimestamp: is the time when the Account lock was taken.

LockFlags: is a bitmap that specifies the list of locks already taken for the data source account.

A DataType lock scheme includes the following parameters: (ExtUserID, LockType, JobType, Server, Timestamp), where ExtUserID: is the unique user identifier that identifies the data source account.

LockType: identifies the class of the DataType lock (for example, Mail, Calendar, etc)

JobType: specifies the DataType job that has taken the lock (for example, Mail)

Server: is the gateway instance that holds the DataType lock (is the IP address of the gateway)

Timestamp: is the time when the Account lock was being taken.

The following code describes a lock-fetch algorithm according to an embodiment of the present invention. Inputs to the lock-fetch algorithm are the request lockType (for example, Account, Mail, Addressbook) and the extUserID of the data source account.

---

```
Synchronized (LockInventory)
{
lockEntry = fetchLockEntryFromInMemoryCache( );
if (lockEntry == null)
    lockEntry = new placeHolderLockEntryInMemoryCache( )
```

-continued

```
}
Boolean lockExpiredFlag = false;
Synchronized (lockEntry)
{
   GetAnExclusiveAccessToDistributedDataSourceAccountLockEntry
   {
      if (lockIsTaken)
      {
         lockExpiredFlag = checkIfLockExpired(lockEntry);
         if (lockExpiredFlag == true)
         {
            Break existing lock
            Grant lock for current request
            Update lock inventory.
            Update local Cache
            Return lockGranted
         }
         else
         {
            If (requestLockType == Account)
            {
               Mark Account-pending in lock inventory
               Update Account-pending info in lockEntry.
               Return lockDenied
            }
            Else//Deals with locks taken by a particular data type
               Return lockDenied
         }
      }
      else
      {
         lockTakenFromInv = Select for update for lock info in
            gateway inv.
         if (lockAvailable)
         {
            Grant Lock
            Update lock inventory.
            Update local cache.
            Return lockGranted
         }
      }
   }
}
```

Table 2 lists various locking scenarios. For each locking scenario, this section describes a set of cases when the first lock-fetch request is received. In Table 2, 0 indicates the lock is available, and 1 indicates the lock is taken.

TABLE 2

| Locking Scenario | LockFlags Field | | | | | | | |
|---|---|---|---|---|---|---|---|---|
| | Account-pending | Account | Mail | Send-mail | Address-book | Calendar | Tasks | Photo |
| No-locks-held | 0 | 0 | 0 | 0 | 0 | 0 | 0 | 0 |
| Account-lock-is-held | 0 | 1 | 0 | 0 | 0 | 0 | 0 | 0 |
| No-locks-held and Account-lock-request-is-pending | 1 | 0 | 0 | 0 | 0 | 0 | 0 | 0 |
| DataType-locks-held and no-account-lock-request-is-pending | 0 | 0 | 1 | 0 | 1 | 1 | 0 | 1 |
| DataType-locks-held and Account-lock-is-pending | 1 | 0 | 1 | 0 | 1 | 0 | 0 | 1 |

In the no-locks-held case, the first Account lock request made is granted. The first DataType lock for each data type (Mail, Sendmail, Addressbook, etc) is granted. In the Account-lock-is-held case, if an Account lock request comes in, it will be denied and the Account-pending flag will be marked. In addition, all accesses to DataType locks will be denied. In the no-locks-held and Account-lock-request-is-pending case, if an Account lock comes in, it will be granted and the pending flag will be cleared. All accesses to DataType locks will be denied.

In the DataType-locks-held and no-account-lock-request-is-pending case, if an Account lock request comes in, it will be denied and the Account-pending flag will be set. On the other hand, if a DataType lock request comes in, the request will be denied if the data types match, and it will be granted if the data types do not match. For example, if a Mail lock is taken, and a request for another Mail lock comes in, the request will be denied. But requests for Calendar, Addressbook, etc will be granted as long as locks are not currently held for those data types.

In the DataType-locks-held and Account-lock-is-pending case, if an Account lock request comes in, it will be denied and all DataType lock requests will be denied. The only exception in this case is a request for a data type lock by a higher priority job. When this happens, the gateway job dispatcher/handler breaks the existing lock and grants it to a higher priority job in the current context.

As described above, the DSGW job engine enables distributed asynchronous job processing capability with at least the following functions: 1) eliminates job loss; 2) supports distributed asynchronous processing of jobs; 3) eliminates service down time by providing a job failover support in the event of a server crash or job overload; 4) ensures data integrity when synchronizing data with different data sources; and 5) improves the scalability.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are to be seen as references to suitable means for providing the described functionality rather than indicative of a strict logical or physical structure or organization.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A data gateway comprising:
    a server farm comprising a plurality of servers;
    a persistent job table storage unit for centrally storing a persistent job table of jobs to be processed by the plurality of servers, wherein a job comprises an update of user data from multiple data sources, and wherein the persistent job table storage unit resides outside the plurality of servers;
    a server table storage unit for centrally storing a server table of statuses of activities of the plurality of servers, wherein the server table storage unit resides outside the plurality of servers; and
    a job engine processor for processing job requests from the multiple data sources using the persistent job table and the server table, wherein the persistent job table further comprises:
        a retry count for indicating number of times the data gateway has tried processing a job;
        a due time for specifying a next time the job is due for processing; and
        a reschedule flag indicating the data gateway has received another notification for the job that is currently being processed.

2. The data gateway of claim 1, wherein the persistent job table comprises:
    user identifier information for identifying a user's entries in the persistent job table;
    data source type information for specifying types of data source accounts;
    job type information for specifying gateway data synchronization jobs; and
    server information for specifying a gateway server currently owning a particular job.

3. The data gateway of claim 2, wherein the data source type information comprises at least an element selected from the group consisting of mail, send mail, calendar, address book, task, and photo.

4. The data gateway of claim 1, wherein the server table comprises: a list of servers and their corresponding schedule timestamps.

5. The data gateway of claim 1 further comprising:
    a content router application interface for interfacing with a backend database; and
    a data source application interface for interfacing with the multiple data sources, wherein the multiple data sources include IMAP, POP, WebDAV, and Exchange.

6. The data gateway of claim 5, wherein the content router application interface comprises:
    a record exchange application interface for exchanging new mail and personal information manager information with a backend database;
    a settings exchange application interface for exchanging folder list and meta-data information with the backend database; and
    a command exchange application interface for exchanging file attachments with the backend database.

7. The data gateway of claim 5, wherein the data source application interface comprises:
    an IMAP adaptor for communicating with at least an IMAP server;
    an MSN adaptor for communicating with at least an MSN server;
    a POP adaptor for communicating with at least a POP server; and
    an Exchange adaptor for communicating with at least an Exchange server.

8. The data gateway of claim 1 further comprises:
    a virtual Internet Protocol load balancer for dynamically mapping jobs to be processed to particular servers according to user identifiers.

9. A data gateway comprising:
    a server farm comprising a plurality of servers;
    a persistent job table storage unit for centrally storing a persistent job table of jobs to be processed by the plurality of servers, wherein a job comprises an update of user data from multiple data sources, and wherein the persistent job table storage unit resides outside the plurality of servers;
    a server table storage unit for centrally storing a server table of statuses of activities of the plurality of servers, wherein the server table storage unit resides outside the plurality of servers; and
    a job engine processor for processing job requests from the multiple data sources using the persistent job table and the server table, wherein the job engine processor comprises:
        a job scheduler processor for scheduling job requests for updating user data;
        a storage queue for storing jobs to be processed;
        a job dispatcher for obtaining a lock for a job to be processed; and
        a job handler processor for processing the job according to the lock and a data source type of the job.

10. The data gateway of claim 9, wherein the job engine processor further comprises:
    a timer for periodically triggering job requests; and
    a change notification handler for sending job requests from registered backend data sources and from user devices.

11. A method comprising:
    receiving, via a data gateway, a job request, the data gateway comprising a server farm comprising a plurality of servers;
    fetching, via the data gateway, jobs due for processing from a persistent job table, stored on a persistent jobs table storage unit, wherein the persistent job table stores jobs to be processed by the plurality of servers, and wherein the persistent job table storage unit resides outside the plurality of servers;
    sending, via the data gateway, jobs to a storage queue;
    rescheduling, via the data gateway, jobs in the persistent job table for processing at a future time dispatching, via the data gateway, from the storage queue to a job handler processor a dispatched job to be processed;

processing, via the job handler processor, the dispatched job by the job handler processor according to a data source type of the dispatched job;

receiving, via the data gateway, a status from the job handler; and rescheduling, via the data gateway, the job in the persistent job table in response to the job being a recurring job and the status indicating the job has been completed.

12. The method of claim 11 further comprising:

receiving, via the data gateway, a status from the job handler; and removing, via the data gateway, the job from the persistent job table in response to the job being a one-time job and the status indicating the job has been completed.

13. The method of claim 11 further comprising:

receiving, via the data gateway, a status from the job handler; and processing, via the data gateway, the job at a future time in response to the status indicating a busy-lock taken.

14. The method of claim 11, wherein dispatching a job further comprises:

obtaining, via the data gateway, a lock according to an account lock and a set of data type locks of the user's account and data respectively.

15. The method of claim 11 further comprising:

updating, via the data gateway, a user account information by implementing a mutually exclusive write of the user account information.

16. The method of claim 15, wherein updating a user account information comprises:

provisioning, via the data gateway, the user account; and updating, via the data gateway, the user account configurations.

17. The method of claim 15, wherein updating a user account information further comprises:

deleting, via the data gateway, the user account; and deactivating, via the data gateway, the user account.

18. The method of claim 11 further comprising:

updating, via the data gateway, user data changes according to an account lock and a set of data type locks of the user's data.

19. The method of claim 18, wherein updating user data changes comprises:

implementing, via the data gateway, a read lock on the account lock; and implementing, via the data gateway, a write lock on a data type lock of the user data being updated.

20. A method comprising:

receiving, via a data gateway, a job request, the data gateway comprising a server farm comprising a plurality of servers;

fetching, via the data gateway, jobs due for processing from a persistent job table, stored on a persistent jobs table storage unit, wherein the persistent job table stores jobs to be processed by the plurality of servers, and wherein the persistent job table storage unit resides outside the plurality of servers;

sending, via the data gateway, jobs to a storage queue;

rescheduling, via the data gateway, jobs in the persistent job table for processing at a future time dispatching, via the data gateway, from the storage queue to a job handler processor a dispatched job to be processed;

processing, via the job handler processor, the dispatched job by the job handler processor according to a data source type of the dispatched job;

receiving, via the data gateway, a status from the job handler;

rescheduling, via the data gateway, a job with a delay in the persistent job table in response to the status indicating a temporary error; and incrementing a retry count in the persistent job table.

21. The method of claim 20 further comprising:

updating in a gateway server table a reschedule timestamp associated with a current server, wherein the gateway server table stores a list of servers and their corresponding schedule timestamps; and rescheduling, via the data gateway, jobs in the persistent job table for processing at a future time.

22. The method of claim 21 further comprising:

retrieving, via the data gateway, a list of inactive servers that have not updated their corresponding reschedule timestamps within a timeout period; and rescheduling, via the data gateway, jobs belonging to the inactive servers for processing.

23. The method of claim 22, wherein rescheduling comprises:

sending, via the data gateway, the jobs belonging to the inactive servers through a virtual Internet Protocol load balancer;

directing, via the data gateway, jobs to new servers for processing; and directing, via the data gateway, subsequent jobs from the same users to the same servers for processing dynamically.

24. A non-transitory computer readable storage medium for tangibly storing thereon program code for execution by a processor, the program code comprising:

code for receiving a job request at a data gateway, the data gateway comprising a server farm comprising a plurality of servers;

code for fetching jobs due for processing from a persistent job table, stored in a persistent jobs table storage unit, wherein the persistent job table stores jobs to be processed by the plurality of servers, and wherein the persistent job table storage unit resides outside the plurality of servers;

code for sending jobs to a storage queue;

code for rescheduling jobs in the persistent job table for processing at a future time;

code for dispatching a job to be processed from the storage queue to a job handler processor;

code for processing the job by the job handler processor according to a data source type of the dispatched job;

code for receiving a status from the job handler; and code for rescheduling the job in the persistent job table in response to the job being a recurring job and the status indicating the job has been completed.

25. The non-transitory computer readable storage medium of claim 24 further comprising:

code for receiving a status from the job handler; and code for removing the job from the persistent job table in response to the job being a one-time job and the status indicating the job has been completed.

26. The non-transitory computer readable storage medium of claim 24 further comprising:

code for receiving a status from the job handler; and code for processing the job at a future time in response to the status indicating a busy-lock taken.

27. The non-transitory computer readable storage medium of claim 24, wherein the code for dispatching a job further comprises:
    code for obtaining a lock according to an account lock and a set of data type locks of the user's account and data respectively.

28. The non-transitory computer readable storage medium of claim 24 further comprising:
    code for updating user account information by implementing a mutually exclusive write of the user account information.

29. The non-transitory computer readable storage medium of claim 28, wherein the code for updating user account information comprises:
    code for provisioning user account; and
    code for updating user account configurations.

30. The non-transitory computer readable storage medium of claim 28, wherein the code for updating user account information further comprises:
    code for deleting a user account; and
    code for deactivating a user account.

31. The non-transitory computer readable storage medium of claim 24 further comprising:
    code for updating changes to a user's data according to an account lock and a set of data type locks of the user's data.

32. The non-transitory computer readable storage medium of claim 31, wherein the code for updating user data changes comprises:
    code for implementing a read lock on the account lock; and
    code for implementing a write lock on a data type lock of the user's data being updated.

33. A non-transitory computer readable storage medium for tangibly storing thereon program code for execution by a processor, the program code comprising:
    code for receiving a job request at a data gateway, the data gateway comprising a server farm comprising a plurality of servers;
    code for fetching jobs due for processing from a persistent job table, stored in a persistent jobs table storage unit, wherein the persistent job table stores jobs to be processed by the plurality of servers, and wherein the persistent job table storage unit resides outside the plurality of servers;
    code for sending jobs to a storage queue;
    code for rescheduling jobs in the persistent job table for processing at a future time;
    code for dispatching a job to be processed from the storage queue to a job handler processor;
    code for processing the job by the job handler processor according to a data source type of the dispatched job;
    code for receiving a status from the job handler;
    code for rescheduling the job with a delay in the persistent job table in response to the status indicating a temporary error; and
    code for incrementing a retry count in the persistent job table.

34. The non-transitory computer readable storage medium of claim 33 further comprising:
    code for updating a reschedule timestamp associated with a current server in a gateway server table, wherein the gateway server table stores a list of servers and their corresponding schedule timestamps; and
    code for rescheduling a job in the persistent job table for processing at a future time.

35. The non-transitory computer readable storage medium of claim 34 further comprising:
    code for retrieving a list of inactive servers that have not updated their corresponding reschedule timestamps within a timeout period; and
    code for rescheduling jobs belonging to the inactive servers for processing.

36. The non-transitory computer readable storage medium of claim 35, wherein the code for rescheduling comprises:
    code for sending the jobs belonging to the inactive servers through a virtual Internet Protocol load balancer; and
    code for directing the jobs to new servers for processing; and
    code for directing subsequent jobs from the same users to the same servers for processing dynamically.

* * * * *